Jan. 17, 1933.  C. L. HALL  1,894,608
PAD FOR MOTOR VEHICLE FENDER WELLS
Filed June 29, 1931
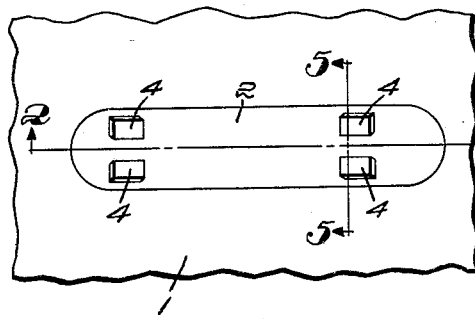
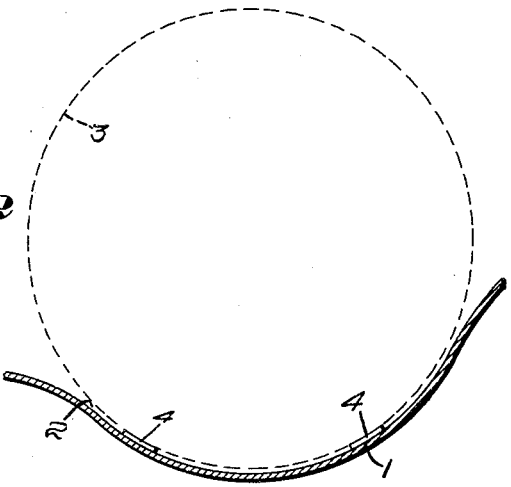
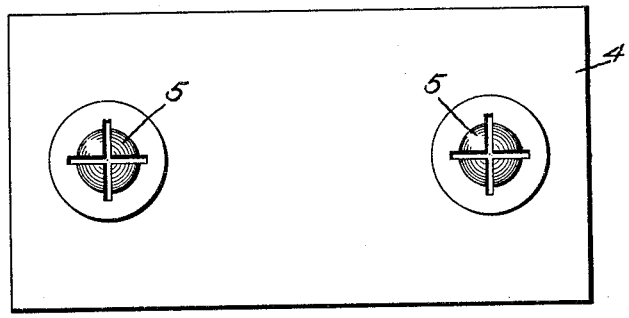
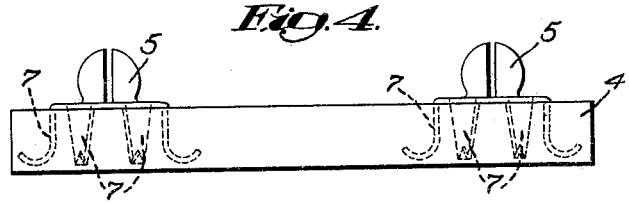
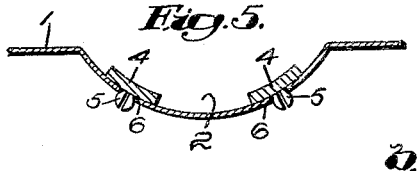
Inventor:
Charles L. Hall
by Emery, Booth, Varney & Townsend
Attys Patented Jan. 17, 1933

1,894,608

UNITED STATES PATENT OFFICE

CHARLES L. HALL, OF DETROIT, MICHIGAN, ASSIGNOR TO UNITED-CARR FASTENER CORPORATION, OF CAMBRIDGE, MASSACHUSETTS, A CORPORATION OF MASSACHUSETTS

PAD FOR MOTOR VEHICLE FENDER WELLS

Application filed June 29, 1931. Serial No. 547,688.

My invention aims to provide improvements in pads for motor vehicle fender wells for spacing the tire from the bottom of the fender well.

In the drawing which illustrates a preferred embodiment of my invention:—

Figure 1 is a plan view of a portion of a motor vehicle fender showing the tire-receiving well and also showing the pads located in the well;

Fig. 2 is a section taken on the line 2—2 of Fig. 1, a tire being shown in dotted lines;

Fig. 3 is an under side view of one of the pads showing two snap fastener stud members attached thereto;

Fig. 4 is an edge view of the pad shown in Fig. 3; and

Fig. 5 is an enlarged section taken on the line 5—5 of Figure 1.

Referring to the particular embodiment of my invention illustrated by the drawing, I have shown the use of quick detachable pads particularly adapted for use in connection with tire wells in vehicle fenders. The particular idea which I have in mind is to provide one or more pads or strips of some suitable material such, for instance, as rubber, rubberized cotton, leather, or webbing, secured in place by means of separable fastening members provided partly by the pads and partly by the material to which the pads are to be attached. The purpose of the pads or strips is to prevent the tire from rattling and also to space the tire from the bottom of the well (Fig. 2) so that any accumulation of water in the bottom of the well will not contact with the tire cover. It has been found that the tire covers rot and thereby become ruined very quickly due to portions thereof within the well being kept wet from water and moisture accumulating in the bottom of the tire well.

In the particular structure illustrated by the drawing I have shown a portion of a fender 1 (Figs. 1 and 2) in which is formed a tire well 2 to receive a spare tire 3 (shown in dotted lines in Fig. 2). In order that the tire may be spaced from the bottom of the well, I have secured in predetermined spaced relation four pads 4 which are secured in position by separable snap fastening members. The separable snap fastening members comprise yieldable stud members 5 and socket members in the form of apertures 6 (Fig. 5) formed in the fender material.

To the particular pads illustrated I have attached two snap fastener stud members 5 by means of a number of prongs 7 which are preferably embedded in the material of the pads so that the metallic parts will not wear the tire or tire cover. By means of these snap fastener studs the pads may be readily attached to the tire well by simply pressing the studs into engagement with the apertures 6 and the pads may be readily removed by merely pulling upwardly upon the pads.

My improved fender well pad installations are simple, durable and particularly desirable from a manufacturing standpoint because of the fact that the apertures 6 may be punched some time during the operation of forming the fender and the stud members may be attached before attachment of the pads to the fender wells, thereby eliminating the use of rivets or any other fastener members which require the use of riveting means to complete the attachment. Furthermore, my improved pads may be attached at any time before or after the fender is in place upon the motor vehicle, whereas with the use of rivets the pads undoubtedly would be attached before attachment of the fenders to the motor vehicle. Therefore, my improved quick detachable structure eliminates unnecessary handling and machine work which would prove rather expensive.

While I have illustrated and described a preferred embodiment of my invention I do not wish to be limited thereby, because the scope of my invention is best defined by the following claims.

I claim:

1. The combination with a fender well open at the top to receive a tire, of a tire-supporting pad secured within the well to space the tire from the bottom thereof to prevent rattle and separable snap fastening means carried partly by the pad and partly by the material of the fender well for permitting quick attachment and removal of said pad.

2. The combination with a fender well open at the top to receive a tire, of tire-supporting pads secured within the well by separable snap fastening means thereby to provide members for spacing the tire from the bottom of the well, said snap fastening means comprising snap fastener stud members attached to the pads and socket means provided by holes in the material of the fender well thereby to permit easy attachment and removal of said pads.

In testimony whereof, I have signed my name to this specification.

CHARLES L. HALL.